United States Patent
Fischer et al.

(10) Patent No.: US 7,703,093 B2
(45) Date of Patent: Apr. 20, 2010

(54) METHOD AND PROCESS MANAGEMENT SYSTEM FOR THE OPERATION OF A TECHNICAL PLANT

(75) Inventors: Detlef Fischer, Adelsdorf (DE); Martin Glaser, Ubstadt-Weiher (DE); Oliver Kaiser, Wörth (DE); Hans-Jürgen Sauer, Herzogenaurach (DE); Thomas Schoch, Ettlingen (DE); Rainer Speh, Weiterstadt (DE); Michael Unkelbach, Buckenhof (DE); Steffen Wagner, Stutensee (DE); Horst Walz, Straubenhardt (DE)

(73) Assignee: Siemens Aktiengesellschaft, Munich (DE)

( * ) Notice: Subject to any disclaimer, the term of this patent is extended or adjusted under 35 U.S.C. 154(b) by 1695 days.

(21) Appl. No.: 10/485,966

(22) PCT Filed: Jul. 26, 2002

(86) PCT No.: PCT/EP02/08353

§ 371 (c)(1),
(2), (4) Date: Feb. 6, 2004

(87) PCT Pub. No.: WO03/014850

PCT Pub. Date: Feb. 20, 2003

(65) Prior Publication Data

US 2004/0249651 A1    Dec. 9, 2004

(30) Foreign Application Priority Data

Aug. 7, 2001    (EP) .................................. 01119040

(51) Int. Cl.
*G06F 9/445* (2006.01)
*G06F 9/44* (2006.01)
*G06F 9/46* (2006.01)

(52) U.S. Cl. ...................... 717/177; 717/103; 717/172; 718/100

(58) Field of Classification Search .................. None
See application file for complete search history.

(56) References Cited

U.S. PATENT DOCUMENTS 5,146,401 A    9/1992    Bansal et al.

(Continued)

FOREIGN PATENT DOCUMENTS

EP    0825506    2/1998

(Continued)

OTHER PUBLICATIONS

"Adaptive user interface for process control based on multi-agent approach", Viano et al., May 2000, pp. 201-204. Online retrieved at <http://delivery.acm.org/10.1145/350000/345316/p201-viano.pdf>.*

(Continued)

*Primary Examiner*—Tuan Q Dam
*Assistant Examiner*—Thuy Dao
(74) *Attorney, Agent, or Firm*—Harness, Dickey & Pierce, P.L.C.

(57) ABSTRACT

A method is disclosed for a system including at least one process management computer and a number of field devices, whereby status and control signals are transmitted between at least some of the field devices and the process management computer using a TCP/IP protocol over a communication channel, preferably a radio connection and/or the Internet. A process management system includes a process management computer with a web-server, a client computer with an Internet browser and a number of sensors and actuators. The process management system may preferably be operated by way of the Internet, using the client computer.

26 Claims, 3 Drawing Sheets

U.S. PATENT DOCUMENTS

| | | | |
|---|---|---|---|
| 5,805,442 A | 9/1998 | Carter et al. | |
| 6,263,487 B1 | 7/2001 | Stripf | |
| 6,546,554 B1 * | 4/2003 | Schmidt et al. | 717/176 |
| 6,571,389 B1 * | 5/2003 | Spyker et al. | 717/176 |
| 6,728,961 B1 * | 4/2004 | Velasco | 718/105 |
| 6,788,980 B1 * | 9/2004 | Johnson | 700/1 |
| 7,062,335 B2 * | 6/2006 | Klindt et al. | 700/83 |
| 7,089,530 B1 * | 8/2006 | Dardinski et al. | 717/105 |

FOREIGN PATENT DOCUMENTS

| | | |
|---|---|---|
| EP | 0875023 | 11/1998 |
| FR | 2781583 | 1/2000 |
| JP | 8106301 A | 4/1996 |
| JP | 11-109933 | 4/1999 |
| JP | 11510294 A | 9/1999 |
| JP | 2000099355 A | 4/2000 |
| WO | WO 99/13388 | 3/1999 |
| WO | WO 99/13418 | 3/1999 |
| WO | WO 99/19782 | 4/1999 |

OTHER PUBLICATIONS

"Optimizing software process control", J. Sukhodolsky, Mar. 2001, pp. 59-63. Online retrieved at <http://delivery.acm.org/10.1145/510000/505791/p59-sukhodolsky.pdf>.*

"Model-Based Control for Industrial Processes Using a Virtual Laboratory", Bui et al., Jun. 2000, pp. 671-680. Online retrieved at <http://www.springerlink.com/content/b34117226n282071/fulltext.pdf>.*

"Embedded Internet technology in process control devices", J. Szymanski, Sep. 2000, pp. 301-308. Online retrieved at <http://ieeexplore.ieee.org/stamp/stamp.jsp?tp=&arnumber=882562&isnumber=19088>.*

Japanese Office Action dated Apr. 5, 2007 with English translation.

Williams T: "Java goes to work controlling networked embedded systems", XP 000631206, Aug. 1996.

Geldammer G: HTML-script calls Java-applet . . . a new development technique under a software- and applications-technology configuration XP002103581, Aug. 1996.

* cited by examiner

METHOD AND PROCESS MANAGEMENT SYSTEM FOR THE OPERATION OF A TECHNICAL PLANT

This application is the national phase under 35 U.S.C. §371 of PCT International Application No. PCT/EP02/08353 which has an International filing date of Jul. 26, 2002, which designated the United States of America and which claims priority on European Patent Application number EP 01119040.2 filed Aug. 7, 2001, the entire contents of which are hereby incorporated herein by reference.

FIELD OF THE INVENTION

The invention generally relates to a method and a process control or management system for operating a technical installation or plant.

BACKGROUND OF THE INVENTION

To control a technical installation, a process control system is normally used which includes a number of components which specialize in particular tasks and are installed at various locations within the technical installation, for example in a power plant for generating electric power.

In this case, the process control system usually has a hierarchic structure involving a plurality of levels. At a field level, the signals which arise during operation of the technical installation and describe the operating state of installation components are detected and control signals are sent to actuating elements for the installation components.

At an automation level, the control functions used to operate the installation are implemented in a plurality of programmable logic controllers (PLCs), for example. During implementation, a specific piece of control software developed for control tasks is usually used (e.g. step 5, step 7 etc.), which can be executed only on particular types of CPUs which are in turn operated by a specific operating system. The automation level receives signals from the field level and sends commands to the field level. In this case, the connection between the field and automation levels can be in the form of individual wiring of each pickup and/or of each actuating element to corresponding inputs and outputs for the automation level, but it is also possible to use a field bus system with a particular, usually very specific transmission protocol for this purpose.

An operator control and monitoring level forms a man/machine interface which an operator can use to operate the technical installation and to obtain information therefrom. In this case, the operator obtains, for example on a screen in a computer system in the form of process images, graphical information about the installation state and he can use, by way of example, a mouse and/or a keyboard in the computer system to input operating commands into the computer system. The operator control and monitoring level is often connected to the automation level by way of a power plant bus system, in which case the bus system is in the form of an optical fiber system, for example, and is operated using a specific transmission protocol.

The computer system for the operator control and monitoring level usually includes a specific piece of operator control and monitoring software installed thereon. The control software is usually produced directly at the automation level using a programming device which is connected to the automation devices (PLCs) and which is used to generate the "target code" for the corresponding automation device, and/or using a separate engineering system which, by way of example, is formed by a computer on which modules are selected from a library and are connected to one another graphically, for example, in order to provide a desired control function. Subsequent compilation generates the target code from the graphical function diagram, and said target code is then loaded on the desired automation device (PLC) at the automation level and is executable.

The use of such a known process control system thus requires the use of hardware and software components respectively tailored to particular tasks. The operator control and monitoring software is not executable on the automation devices. Further, conversely, the control software is not executable on the operator control and monitoring system's computer system.

To operate a technical installation, it is thus necessary to use various systems in parallel beside one another which are not suitable for taking on tasks from one of the other systems. In addition, the systems also cannot be arranged at almost any physical distance from one another, since the connection between them, usually a bus system or individual wiring, cannot be extended arbitrarily. Further, such an extension—if it is at all possible to implement—would be very expensive and susceptible to error.

Conventional process control systems are thus usually arranged in strictly hierarchic form, with each level of the hierarchy using systems which are specifically matched to the respective task, such as the aforementioned PLC or the aforementioned automation bus systems (for example the Sinec H1 bus from Siemens or the Profibus). The systems are then also usually operated with software packages developed specifically for automation technology. Since, as already mentioned, the maximum reachable distance at which the components of a known process control system can be installed away from one another is limited, it is usually the case in practise that virtually all the components of the process control system are installed within the technical installation.

Such a known process control system is very expensive, since specific hardware and software is used which still needs to be configured and parameterized by experts for use in the technical installation. In addition, it is possible to diagnose, maintain and optimize components and functions of the process control system practically only in situ. Furthermore, known process control systems have only very limited control options from locations which are outside the technical installation (to this end, known process control systems usually have a separate system, such as a gateway, with this specifically configurable gateway often being able to be used to perform only a portion of the control tasks externally; in this case, it is frequently necessary to couple systems having different transmission protocols with a great deal of involvement).

In addition, an operator needs to obtain specific training in order to be able to operate the process control system.

The strict hierarchic structure of a known process control system can take the following form, for example:

At least one automation device (e.g. a PLC) at the automation level stores control programs produced in a specific programming language, and these control programs are executed there. By way of example, the automation device stores the control algorithm for operating a motor.

The operator control and monitoring system stores the graphical process images, for example, in which the current process measurement and state values are overlaid as dynamic image components, and command areas are provided in which the user can send an operator control command (e.g. start up/set in motion; prescribe nominal value etc.) using a mouse click or a keyboard input, for example.

The operator control command is then transmitted, for example using a power plant bus system, to the automation level, where it is then executed by a control program running on the automation device, this involving the control program driving actuating elements in the technical installation and reading in measurement values from sensors, for example.

In the case cited by way of example, the operator control and monitoring system has the motor's process image stored in it, for example. Further, the current operating states of the motor (e.g. the speed, power, operating time, temperature etc.), which are sent to the operator control and monitoring system by the automation system using the power plant bus system, are overlaid in said process image. The user is then able to click on a command button on the screen or to press a key, for example, and thereby to start the motor, to stop it or to request a higher power etc. (in which case the control program associated with the respective command is executed in the automation system).

An engineering system for the process control system engineers the process control system's control functionality, for example, by calling control modules from a software library, connecting them to one another and supplying them with parameter values, for example on a graphical user interface. The resultant control programs put together from a plurality of control modules are then converted (compiled) to that target code which is then loaded on a target device at the automation level and is executable there. The engineering system is also able, by way of example, to create and parameterize the process images with their static and dynamic image components; the process control system is thus configured and engineered using the specialized engineering system.

Furthermore, there can additionally be a separate diagnosis system which is used to monitor the operating state of the technical installation particularly the critical operating states.

In summary, it can be said that, in order to perform its tasks, a known process control system requires a multiplicity of specialized, heterogeneous subsystems in which usually specific hardware and software are used. Operating and configuring such a heterogeneous overall system are therefore very complex, and the implementation and purchase costs of such systems are very high. In addition, such process control systems are not very flexible, inter alia on account of the high level of specialization of its subsystems.

SUMMARY OF THE INVENTION

An embodiment of the invention includes an object of specifying a method and a process control system for operating a technical installation which overcome at least one of the aforementioned drawbacks. In particular, the intention of one embodiment is that it should be largely possible to use universal computers (that is to say computers and automation devices which have not been developed specifically for automation) and to use universal software (that is to say software which is already as widely used as possible and has not been developed specifically for automation).

With regard to the method, an embodiment of the invention achieves an object by a method for operating a technical installation having a number of field devices for monitoring and controlling components of the technical installation, at least one process control computer for monitoring and controlling the technical installation, and at least one communication channel by which the field devices are connected to the process control computer. The field devices transmit to the process control computer, measurement data which arise in the technical installation and describe the operating state of at least one of the components. They further receive the control commands from the process control computer. The state and control signals are transmitted between at least one portion of the field devices and the process control computer via the communication channel using a TCP/IP protocol.

In this case, an embodiment of the invention is based on the consideration that the flexibility of the method is increased particularly when the data for the measurement-data and control commands are transmitted using a protocol which can be used for a multiplicity of communication channels and which requires no hardware and software developed specifically for automation technology. This is intended to allow an embodiment of the inventive method to use largely already existing communication channels for transmitting said data, particularly without this requiring installation of a separate, specific bus system with a specific transmission protocol.

In an embodiment of the inventive method, communication between the components of the process control system takes place as far as possible using the cited protocol, the communicating stations involved (particularly the field devices and the process control computer) supporting an IP addressing mechanism in this case.

Advantageously, the communication channel includes the Internet and/or an intranet and/or a radio link.

In this way, it is possible for the components of the process control system used for the inventive method, particularly the field devices, which are preferably arranged in the technical installation, and the process control computer to be arranged at virtually any physical distance from one another. Communication between the components may take place using the Internet, which is already in widespread use throughout the world, and/or an intranet already installed in a physical environment and/or using a radio link. It is thus not necessary to implement the communication channel separately in the form of hardware, which would entail a severe limitation of the possible physical distances between the components of the process control system.

When using the Internet and/or the intranet, the TCP/IP transmission protocol already known and used therein is used. Thus, no specific developments and/or extensive alignments are required in order to implement communication. Even when using a radio link for communication, it is a simple matter to use the TCP/IP transmission protocol; the radio link can in this case be covered by the Internet and/or intranet.

In one advantageous refinement of an embodiment of the invention, the process control computer includes a web server for connecting the process control computer to the Internet and/or an intranet, and operator control and/or monitoring functions of the technical installation. They are implemented in the process control computer by way of software, and are executed using a client computer. The client computer uses an Internet browser and is connected to the Internet and/or intranet, by way of Internet access to the process control computer.

In this advantageous refinement of an embodiment of the invention, the process control computer can be installed at virtually any location(s) at which access to the Internet and/or to the intranet is possible. In addition, operator control and monitoring of the technical installation can also be carried out from almost any location using the client computer.

In this case, the client computer needs to have as software—besides an operating system—essentially only a known Internet browser and otherwise virtually no specific software (such client computers are referred to as "thin clients"). The client computer can thus use the Internet browser to access the process control computer via the Internet and/or the intranet and to operate the functions implemented on the process control computer which relate to operation of the technical installation via the Internet. It can also use the Internet to retrieve the operating information processed in the process control computer, such as state messages and measurement values for the technical installation, via the Internet and can display them on the client computer.

In this case, the client computer's Internet access to the process control computer preferably includes a security check. For example, it may include a request for a password, in order to prevent access by unauthorized persons. It is also possible to provide a plurality of passwords for Internet access, with each password having a respective associated use authorization with a particular scope.

In another advantageous refinement of an embodiment of the invention, the operator control and/or monitoring functions are put together from software components which each contain directly executable software code.

An overall functionality, to be implemented in software, for a process control system in accordance with an embodiment of the invention is formed by virtue of software components which, for their part, are already executable on a computer, for example a universal computer, and which implement a particular subfunction being put together to form a new, more extensive function. The function is thus generated essentially by combining, as far as possible, subfunctions which have already been implemented and are executable. In this case, the operator control and monitoring functions comprise, in particular, automation functions for the process control system which control and/or regulate the components of the technical installation.

Advantageously, at least one of the operator control and/or monitoring functions is put together from at least two software components and is executed without any compilation and loading operation taking place for this operator control and/or monitoring function beforehand on that computer on which this function is executed.

For such a newly generated function to be created and to be executed, there is thus no need for the intermediate step of converting the function into the target code for that computer on which the function is intended to be executed. The function is executable on the target computer immediately after the at least two software components have been put together. Thus, the control software produced in this manner is virtually independent of the computer platform on which it is intended to be executed. A suitable programming language for creating such control software is the programming language JAVA, which can be used to generate byte code, which is executable immediately on a "virtual JAVA machine". Such virtual machines can be obtained for almost all known, especially universal, computer platforms (universal computers). In addition, JAVA applications produced using the programming language JAVA, for example control and monitoring programs for a technical installation, are directly executable under most known web browsers and also require no specific program execution environment.

Advantageously, "intelligent" field devices are used for data acquisition and command output in the technical installation. The intelligent field devices have a dedicated microprocessor at the very least and have a virtual machine (described above) installed on them. Thus, operator control and/or monitoring functions in the technical installation are also "moved out" to these field devices and can be executed directly thereon. In this case, the functions do not need to be compiled and loaded on the field device beforehand in order to be executed thereon.

In one particularly advantageous refinement of an embodiment of the invention, essentially all of the process data for the technical installation which are processed in the process control computer are respectively assigned a URL address.

The addressing is known particularly from the area of the Internet, where particular contents, such as pages or other data areas on the Internet, can be retrieved directly by inputting said URL address in an Internet browser. An embodiment of the present invention involves the use of mechanisms already realized on the Internet. Thus, directed retrieval of process data, e.g. using a client computer, via the Internet is a simple matter.

With regard to the process control system, an embodiment of the invention achieves the object by way of a process control system for operating a technical installation which comprises the following parts:

a) at least one process control computer for monitoring and controlling the technical installation, which process control computer comprises a web server which can be used to set up a connection to the Internet and/or to an intranet such that process data arising in the process control computer can be transmitted via the Internet and/or intranet and data can be received from the Internet and/or intranet, b) at least one client computer for operator control and/or monitoring of the technical installation via the Internet and/or an intranet using an Internet browser which is installed on the client computer and can be used to connect the client computer to the Internet and/or intranet, and c) a number of sensors and actuators which are arranged in the technical installation and are used to record measured variables in the technical installation and to make adjustments to components in the technical installation which are connected to the process control computer via at least one communication channel and transmit measurement data to said process control computer and receive control commands from said process control computer.

Such a process control system is particularly flexible, since, by way of example, operator control and monitoring of the technical installation is not limited to the location of the technical installation. The process control computer used to operate the technical installation uses the web server to make the process data processed in it available such that it is possible to access these data via the Internet using the client computer. In this case, the client computer ("thin client") essentially needs to have just a known Internet browser and otherwise requires no special software. It is also possible for the process control system to be configured and/or parameterized using the client computer, which in this case accesses the process control computer. Furthermore, the client computer can be used to perform (remote) diagnosis both for the process control system and for the technical installation by accessing the process control computer.

Advantageously, the communication channel includes a radio link and/or a bus link and/or the Internet and/or an intranet.

In this way, it is possible for the process control computer not necessarily to need to be installed in direct proximity to the technical installation, since the signals from the sensors and actuators, which are preferably arranged in the technical installation, can be transmitted over long distances (when the Internet is used, virtually throughout the world) using said transmission media. In this case, the radio link can be covered by the Internet and/or intranet. The process control computer can in this case be in a "server park", for example, which is located with a service provider and is operated by the latter. The technical installation itself thus essentially need now contain only the sensors and actuators which record the measurement data for the technical installation and send the control commands thereto.

With particular advantage, the process control computer is operated using a real-time operating system and is configured in redundant form such that at least one error occurring during operation of the process control computer does not result in loss of the functionality of the process control computer. Further, operation of the process control computer in such a case of error can be continued practically without delay and without loss of data. In this case, the real-time operating system can be in the form of a universal operating system with real-time properties.

In a technical installation, a number of time-critical operations generally need to be monitored and/or controlled and/or regulated. Thus, the computers used for this purpose need to have a deterministic response, so that particular processing steps are executed with certainty in a known, predictable time interval. To this end, it is necessary to use a real-time operating system in order to prevent any damage to the technical installation and/or any risk to humans and the environment and in order to be able to configure operation of the technical installation as best possible.

To be able to prevent disruption of the operating cycle in the technical installation and/or risk even better, the process control computer is additionally configured so as to be "1-error proof" (in redundant form) by way of preference. Thus, at least one error arising during operation of the process control computer does not result in loss of the latter's functionality. Further, the process control computer's operation can be continued in such an instance of error virtually without delay and without loss of data. It is thus certain that, in particular, critical operations within the technical installation which need to be controlled by the process control computer can be processed without disruption. To this end, by way of example, the most important components of the process control computer can be provided a plurality of times and, in the event of an error, a piece of error software, for example, ensures that operation is continued virtually without delay using intact components.

Such a process control computer is thus largely failsafe. It is thus also possible to implement virtually the entire functionality of the process control system in the process control computer and to dispense with the strictly hierarchic structure of known process control systems by eliminating at least the automation level for example, which usually contains specific programmable logic controllers (PLCs) which can also be used to process time-critical tasks. Since the process control computer in the inventive process control system can also process time-critical tasks using a real-time operating system and is configured in redundant form so as to be failsafe, it is therefore possible to dispense at least with the previously known and automation level and its specific automation devices.

Advantageously, at least a first portion of the control software required for controlling the technical installation is installed and can be executed on the process control computer.

The process control computer is a central component of the inventive process control system. Accordingly, at least one portion of the necessary control software is installed and can be executed on this computer. If the process control computer has real-time capability and/or is configured in redundant form so as to be failsafe, then this first portion of the control software preferably includes those software programs which concern time-critical and failsafe operation of the technical installation. It is thus ensured that at least such control tasks are processed largely without proneness to disruption and with certainty within a precisely determined period of time, without any loss of data arising during processing and without the need to input data which already exist and/or commands which have already been input again.

Advantageously, the process control system includes at least one field device for monitoring and controlling components of the technical installation. The field device includes a second portion of the control software required for controlling the technical installation and has at least one microprocessor which can be used to execute the second portion of the control software on the field device. The field device reads in, preprocesses and transmits to the process control computer the measured variables for the technical installation from the sensors. It further is adapted to receive, preprocess and transmit to the actuators, the control commands from the process control computer.

In this advantageous refinement of an embodiment of the invention, at least one portion of the signals from the sensors and actuators are processed in an "intelligent" field device. In this case, a portion of the control functionality of the inventive process control system has been "moved out" to these field devices. Thus, the functions which have been moved out are executed directly on the field device, and the corresponding sensor and/or actuator signals are input and output directly by the field device.

Hence, in the case of this embodiment, a portion of the functionality of the process control system is implemented in the field devices. Such functions implemented in the field devices are preferably accessed and operated using the client computer.

The described moving-out of functions to the intelligent field devices affords the advantage that the process control computer can be equipped with fewer memory and/or computation resources. In addition, these functions can be executed more quickly, since the field devices are usually located directly in the technical installation. Therefore, the data transfer to the intelligent field devices is reduced because no data relating to the internal execution of control functions need to be transmitted from the process control computer to the field device, since these control functions are executed directly on the field device. It is also possible to use the control functions available on the field device even if, by way of example, the process control computer should be temporarily unavailable.

Such functions which have been moved out to the field devices preferably relate to time-critical and/or security-related requirements.

With particular advantage, the control software is formed from a number of software components which have the following properties:
  a) each software component implements a respectively associated function of the control software,
  b) each software component comprises byte code which is executable on a target computer, for example on the process control computer and/or on one of the field devices, directly without a preceding compilation and loading operation,
  c) each software component is executable independently in the sense that it does not require execution of another software component in parallel in order to be executed, and
  d) each software component has a respective interface which can be used to set up at least one connection from a first software component to a second software component and/or a connection to the web server and/or a connection to at least one sensor and/or actuator, the interfaces being compatible with one another such that setting up the connection does not require any alignment of signals which are transmitted via the connection, but rather inputs and/or outputs on the interface of the first software component can be connected directly to outputs and inputs on the interface of the second software component.

In this case, the software components are independent of the computer platform on which they are intended to be executed. Particularly suitable for implementing such software components is the programming language JAVA, which can be used to generate byte code. Such byte code is directly executable on a large number of computer platforms without the need for the program code to be compiled for this purpose.

The software components are preferably self-contained and encapsulated. Thus, each software component provides a function respectively intended for it in full. Further, the software component's flows of data which arise internally during execution of the software component, values of internal variables etc. cannot be accessed. The software components' interfaces can also be connected during execution of one or more of these software components, in order to produce a new functionality, which means that it is possible to configure the control software "on line" and the resultant new function is available immediately after connection of the interfaces of software components, without the need for the software components connected by way of the interfaces to be compiled and (re)loaded beforehand.

Preferably, the process control computer and the client computer include a virtual machine software program. As such, at least one portion of the software components is executable both on the process control computer and on the client computer without the need for alignment of the software components with the respective target computer for this purpose.

With particular advantage, in an embodiment the field device includes the virtual machine software program. As such, that at least one portion of the software components is also executable on the field device without the need for alignment of the software components for this purpose.

The overall functionality of the inventive process control system is thus formed by software components which contain byte code which can be executed on a virtual machine software program. As a result, the control software implemented by the software components is virtually independent of the computer platform on which it is intended to be executed. If the software components are implemented using the programming language JAVA, then the byte code created using JAVA can be executed on the virtual machine software program, which can be obtained for virtually all computer platforms.

In addition, applications produced using the programming language JAVA are directly executable under virtually any known web browser without the need for a specific program execution environment in addition. Intelligent field devices preferably likewise have such a (JAVA) virtual machine software program installed on them, so that preferably software components produced by JAVA and connections of software components can be executed directly on such field devices. This makes the inventive process control system very flexible and it requires virtually no specific hardware and software and is additionally not tied in terms of installation location; only the field devices need to be installed close to the technical installation or in it.

Field devices on which the virtual machine software program cannot be implemented and on which it is therefore not possible to execute any of the control software are incorporated into the software component concept, mentioned further above, using "hardware proxies". The hardware proxies are likewise software components which detect data from nonintelligent field devices and/or output data to them and condition these (raw) data such that it is also possible to address these nonintelligent field devices using an interface corresponding to the interface for a software component. Such field device software programs can thus be integrated into the control software as a "normal" software component by means of their hardware proxies.

In another advantageous refinement of an embodiment of the invention, at least one portion of the software components respectively has a message processing unit, assigned on the basis of the respectively implemented function, and/or a diagnosis unit and/or an operator control and monitoring unit and/or a parameterization unit, these units are accessible via the software component's interface.

Each software component implements, as completely as possible, a subfunction of the control software for the inventive process control system. In accordance with this embodiment of the invention, at least one portion of the software components contains a respective message processing unit which can be used to read critical and/or characteristic state values relating to the implemented function, which arise particularly during execution of the software component, via the software component's interface. These critical and/or characteristic values can also have a corresponding text message associated with them which can likewise be read via the interface. The described functionality of message processing and alarm handling is thus an integral part of the software component and does not need to be implemented separately, e.g. in the process control computer.

At least one portion of the software components can also have a diagnosis unit which can be used to produce diagnosis signals which can be read via the software component's interface and which allows an assessment of a current and/or expected future operating situation for a component, controlled by a software component, in the technical installation. In this embodiment of the invention, such a diagnosis function thus does not need to be implemented separately, e.g. in the process control computer.

At least one portion of the software components can also have an operator control and monitoring unit which is used to transmit signals to the software component's interface which are used for controlling and/or monitoring the function implemented by the software component. These signals can be, by way of example, a first signal group, which includes the function's most important operating state values which can be used in a graphical presentation, and a second group of signals, which can be used includes the most important commands which can be executed by the function. It is thus not necessary to condition and/or to group the signals required for controlling and monitoring a component controlled by a software component in the technical installation separately, e.g. in the process control computer.

Furthermore, at least one portion of the software components can have a parameterization unit which can be used to receive parameter values required for executing the function from the software component's interface. If, by way of example, a software component implements a control algorithm, then the interface can be used to transfer parameter values to the software component's parameterization unit, such as an adjustment time, a lead time or gain factors. These parameter values can thus be altered, and hence the control algorithm can be optimized on line, during execution of the software component as well, for example. In this case, it is not necessary for such a functionality for parameterizing the software components to be provided in the process control computer or in a separate system, for example.

The additional functions described above of message processing, alarm handling, diagnosis, operator control and monitoring, and parameterization, which are each implemented by the software components as integral parts thereof, thus make the previously known and required, correspondingly specialized systems superfluous in practise. Instead of specific message and alarm processing systems, diagnosis systems, operator control and monitoring systems and engineering systems, this embodiment of the invention has specific views of the software components, with each view representing one of said functions. The views can be retrieved directly by accessing the software components' interface. Advantageously, the aforementioned views of the software components are accessed by the client computer, which is preferably a universal computer which uses an Internet browser, preferably having JAVA capability, to access the process control computer via the Internet or the intranet using Internet technology and retrieves and visualizes the appropriate views of the software components.

Advantageously, essentially all of the functionality required for controlling and monitoring a technical installation is integrated in the process control computer.

This reduces the complexity of the process control system, particularly with regard to the number of subsystems therein.

With particular advantage in an embodiment of the invention, all of the process data which are fundamental to monitoring and controlling the technical installation and are processed in the process control computer have a respective dedicated URL address associated with them, which means that the client computer can be used to access at least portions of these process data directly.

The URL addressing mechanism is known particularly from the area of the Internet. By inputting a URL (Internet) address in an Internet browser, it is thus possible to access portions of the process data directly. Using the client computer, this allows input of a URL address in the client computer's Internet browser so as to retrieve, by way of example, the current value of the flow through a pump, the current speed of a motor, data in an archive in the process control system etc. in the technical installation directly via the Internet.

BRIEF DESCRIPTION OF THE DRAWINGS

Further advantages, features and details of the invention will become evident from the description of illustrated exemplary embodiments given hereinbelow and the accompanying drawing, which is given by way of illustration only and thus is not limitative of the present invention, wherein.

DETAILED DESCRIPTION OF THE PREFERRED EMBODIMENTS

Figure 1:
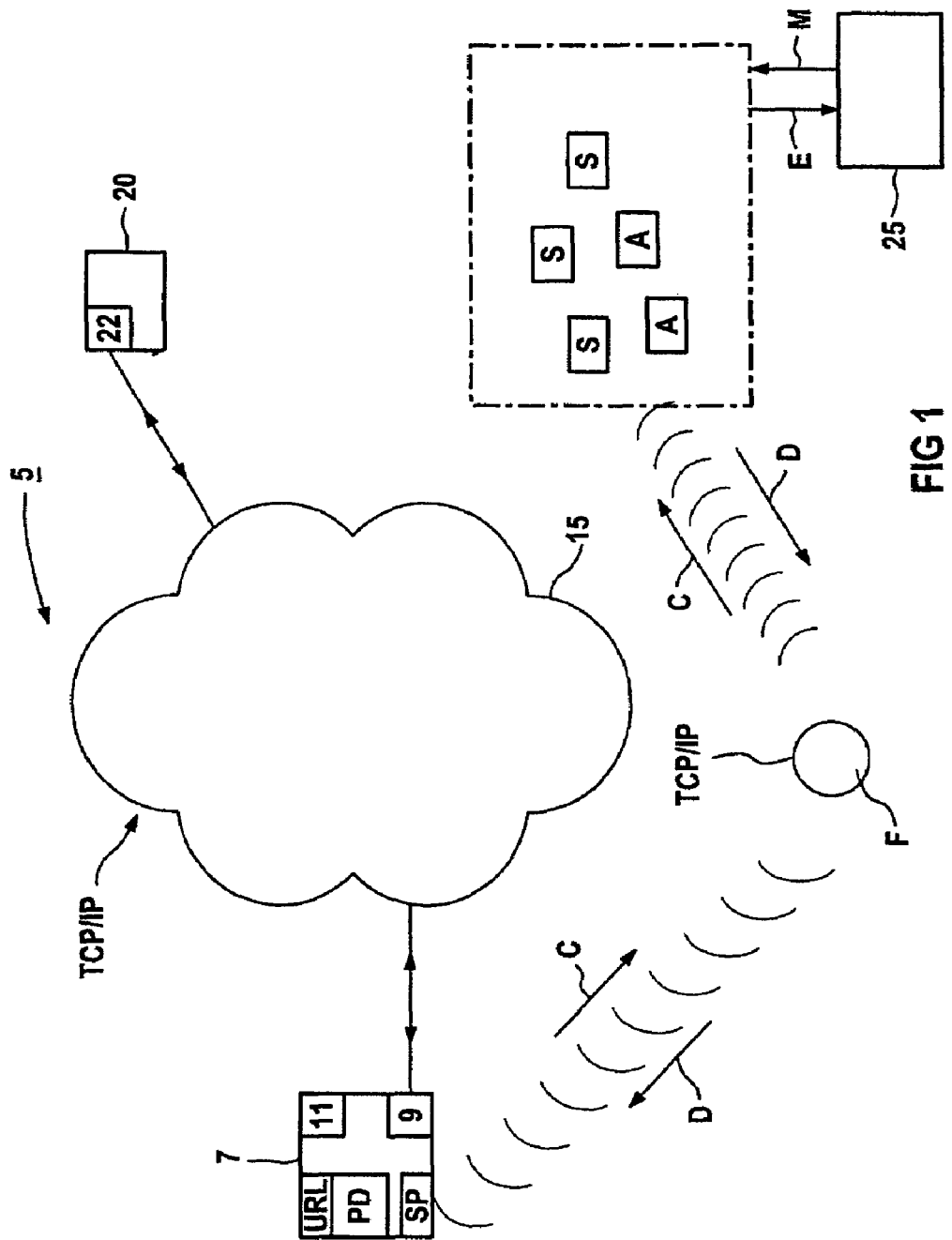
FIG. 1 shows a schematic illustration of an inventive process control system on an embodiment for operating a technical installation, where the control software is centralized in the process control computer.

FIG. 1 shows a process control system 5 which comprises a process control computer 7, a client computer 20 and a number of sensors S and actuators A arranged close to or in the technical installation 25.

The process control computer 7 is used for monitoring and controlling the technical installation 25. It has a web server 9 which has been used to set up a connection to the Internet 15.

The measured variables M arising in the technical installation 25 are recorded by the sensors S and are transmitted as measurement data D to the process control computer 7 via a radio link F using a TCP/IP protocol. Implemented in the process control computer 7 is the control software SP for the inventive process control system. This control software SP implements the functions which are required for operating the technical installation 25 by reading in and processing the measurement data D and transmitting control commands C via the radio link F. The control commands C result in adjustments E in the technical installation 25 by means of the actuators A.

The process control computer 7 is operated using a real-time operating system 11. Thus, the processing operations taking place in the process control computer 7 are deterministic, so that it is known in advance and is certain within which time interval a particular processing operation can be performed with certainty. Further, the process control computer 7 can also implement time-critical functions, for which a deterministic program response from the control software is indispensable.

The process control computer 7 is also configured in redundant form, so as to be failsafe, such that an error arising in the process control computer 7 does not result in failure thereof and hence in a loss of its function. In such an instance of error, the process control computer 7 can continue to be operated virtually without delay and without loss of data. To this end, the process control computer can have, by way of example, fundamental hardware and software parts a plurality of times and can also comprise a control unit which, in the event of an error, coordinates the parts which are still functional such that virtually undelayed operation is maintained.

The functions of the control software SP which are implemented in the process control computer 7 and also the monitoring of the process data PD which are fundamental to operation of the technical installation are performed primarily by way of the client computer 20, which comprises an Internet browser 22 for connection to the Internet 15.

In the case of the inventive process control system, it is thus no longer necessary for the components of the process control system to be situated virtually entirely in or at least very close to the technical installation. The use of the Internet and/or of a radio link—the radio link being able to be covered by the Internet—for communication between the components makes it possible for the process control system to be physically distributed over very long physical distances as well. The control software SP is preferably implemented in the programming language JAVA. The Internet browser 22 on the client computer 20 has JAVA capability, which means that applications produced using the programming language JAVA can be executed in the Internet browser 22.

The process data PD in the process control computer 7 are respectively provided with a URL address. As such, the client computer 20 can retrieve a desired process data item or a plurality of desired process data directly via the Internet 15 by inputting a URL address associated with a particular process data item in the Internet browser 22.

The use of the Internet 15 for communication between the process control computer 7 and the client computer 20 makes it superfluous to implement a specific communication link, such as a bus system, between said computers, since the Internet already provides transmission mechanisms, such as the TCP/IP transmission protocol, which are used by the inventive process control system. Instead of or as a complement to the radio link F, the measurement data D and/or the control commands C can also be transmitted via the Internet 15, preferably using TCP/IP transmission protocol. The radio link F can also be covered by the Internet.

Figure 2:
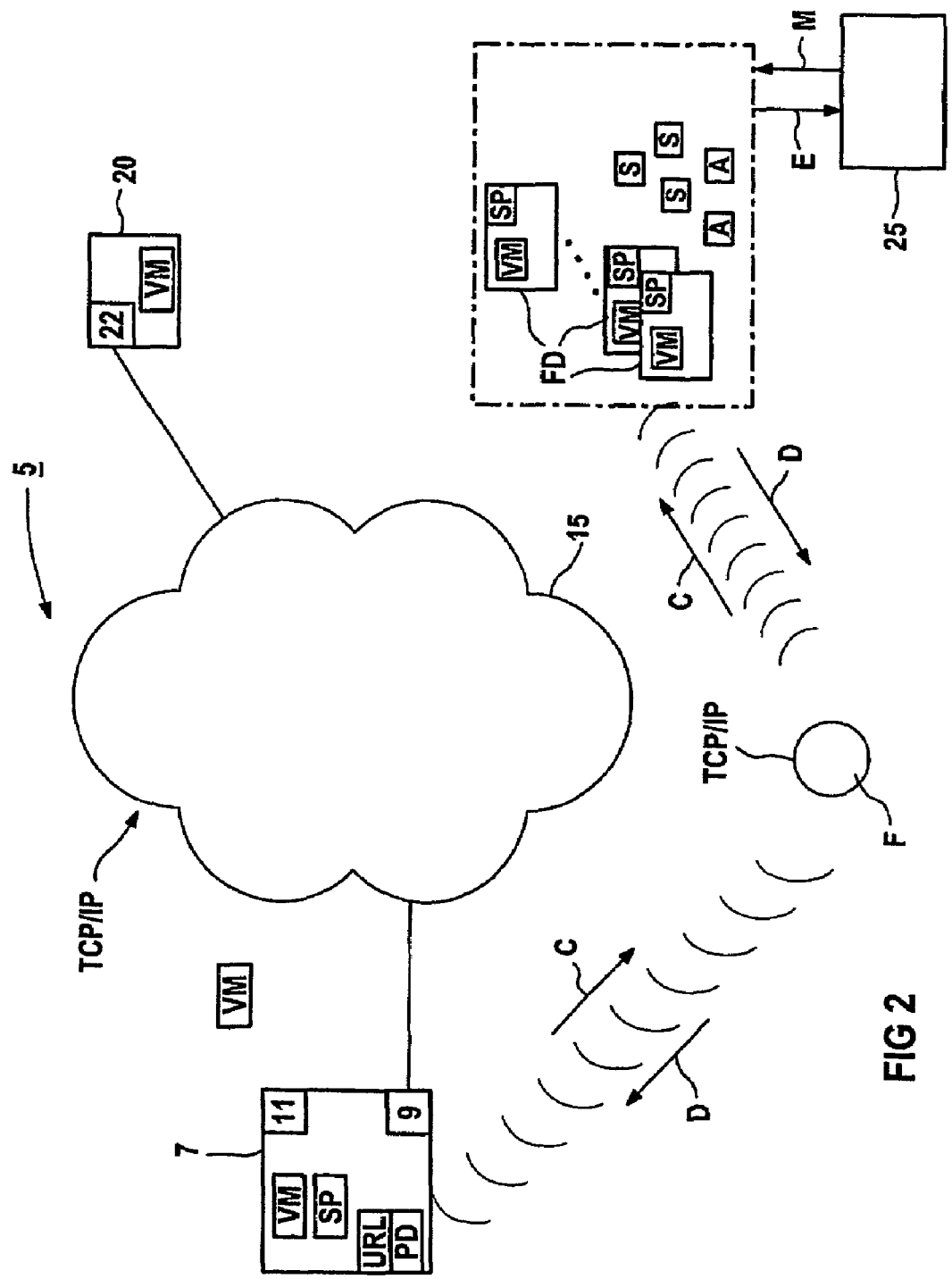
FIG. 2 shows a schematic illustration of an inventive process control system of an embodiment for operating a technical installation, where the control software is distributed over a plurality of systems.

FIG. 2, like FIG. 1, shows a process control system 5 in accordance with an embodiment of the invention, with, unlike in FIG. 1, field devices FD having a respective dedicated microprocessor additionally being provided, so that the control software SP for the process control system 5 can be distributed over the process control computer 7 and one or more field devices FD.

The field devices FD shown in FIG. 2 are referred to as intelligent field devices, because they have as already mentioned a dedicated microprocessor on which at least relatively simple, less complex control programs for the control software SP can be executed, particularly control programs with time-critical and/or security-related requirements.

The control software SP is formed from a number of software components 30.

The process control computer 7 and the field devices FD also have a virtual machine software program installed on them. Thus, at least one portion of the software components 30 of the control software SP can be executed both on the process control computer 7 and on the field devices FD without the need for the software components 30 to be aligned for this purpose. The client computer 20 is likewise intended to include a virtual machine software program. Thus, at least one portion of the software components 30 can also be executed on the client computer 20. This can be done without the need for the software components 30 to be aligned for this purpose.

The virtual machine software program is a standard execution environment for software components 30 of the control software SP, regardless of the hardware platform on which the virtual machine software program VM is installed. as such, it is possible to distribute software components 30 of the control software SP virtually arbitrarily over systems on which a virtual machine software program is installed. The use of intelligent field devices FD is particularly advantageous, since these field devices are usually installed close to or in the technical installation 25, and hence virtually no delays occur for command execution or when reading in data from the technical installation. In addition, the described distribution of the control software SP over the process control computer 7 and the intelligent field devices FD is advantageous because, in this case, the process control computer 7 can be relieved of the burden of time-critical and/or security-related control tasks, and hence it is possible to attain a reduction in the demands, particularly as regards availability and deterministic processing, on the process control computer.

Figure 3:
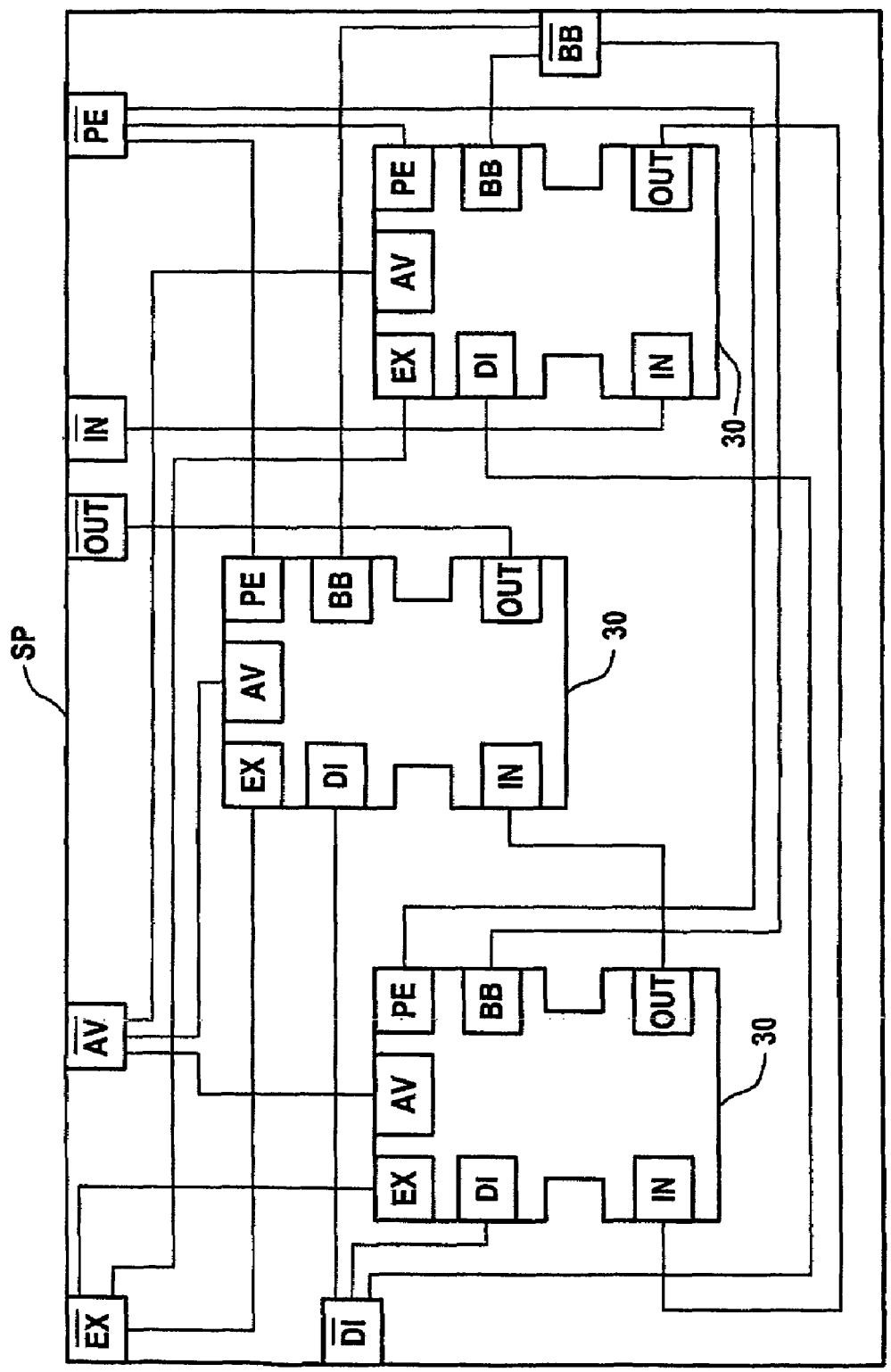
FIG. 3 shows a schematic illustration of the control software for an inventive process control system of an embodiment which is formed from a plurality of software components.

FIG. 3 shows the control software SP, formed from a number of software components 30, by way of example. In this case, each software component 30 implements a respective function intended for it. In addition, each software component 30 comprises byte code which can be executed directly without any prior compilation and loading operation on a destination computer, for example the process control computer and/or a field device FD. Each software component is independently executable in the sense that it requires no parallel execution of another software component in order to be executed. The control software SP shown by way of example in FIG. 3 is produced by connecting three software components 30. To this end, the interfaces of the software components 30 are connected such that an output OUT on the interface of the software component shown on the right in FIG. 3 is connected to an input IN on the interface of the software component shown on the left in the figure.

In addition, an output OUT on the interface of the software component shown on the left in FIG. 3 is connected to an input IN on the software component shown in the center in FIG. 3. The overall function of the control software SP as a result of the connection can be used via an input IN and an output OUT. A plurality of control programs can be provided which are each designed like the control software SP. These control programs can then interchange data with one another via the inputs IN and outputs OUT.

Each software component 30 also has a message processing unit AV, a diagnosis unit DI, an operator control and monitoring unit BB and a parameterization unit PE.

The units are also used to provide, in addition to the control functions implemented in the software components, associated message processing functions, diagnosis functions, operator control and monitoring functions and parameterization functions. As such, each software component 30 is self-contained, not only from a functional point of view but also from the point of view of the aforementioned additional functions of message processing, diagnosis, operator control and monitoring, and parameterization. These functions do not need to be implemented in separate, specialized systems, as is usual in the case of known process control systems, but rather are available to the control software SP, the software components 30, even in the case of the smallest modules. Combining the signals from the units of the software components 30 into a respective superordinate unit AV, DI, BB, and PE then also makes the units provided for each individual software component available for connecting software components. As such, this connection to the outside acts and can be used like an individual software component 30.

The diagnosis unit DI or DI can also monitor the function and/or communication of the software component 30 and also its dedicated parameter values itself. As such, it can be executed more or less under its own monitoring and independently. As already mentioned, the software components 30 are each directly executable without the need for a prior compilation operation and subsequent loading operation for this purpose. This also applies to the executability of functions which have been put together from at least two software components. The software components 30 are thus instantiated directly while a function is still being configured. The diagnosis unit DI and/or DI can be used by the software components 30 for automatically executing extensive diagnosis and/or test operations during the actual configuration, without the need for such diagnosis and/or test routines which relate to the function of the respective software components 30 to be processed by a separate unit and/or a separate test program.

In addition, a software component 30 can also be formed by a graphical control and visualization module ("faceplate") which is associated with an installation component of the technical installation and implements graphical representation thereof for operator control and monitoring (installation component image with current process data values and also a command input device for control purposes).

Another software component 30, which includes a control program for an installation component, for example, can then interact directly via its interface with the faceplate's interface. The communication between a software component 30 and a software component which is in the form of a faceplate, particularly when using the Internet as the communication channel, is advantageously bundled at first, i.e. data interchange between a plurality of software components is implemented by initially transmitting the data which are to be interchanged in the form of an entire data packet and splitting the data contained in the data packet back over the corresponding target software components at the destination. The data interchange between software components 30 in any form can take place using the described bundling and resplitting of the data. In this case, data interchange can take place either cyclically or under event control; it is thus possible to transmit particular data either at fixed intervals of time or just when there is a triggering event, e.g. a change of operating state. With particular advantage, the communication as between the software components is handled as a hybrid form including cyclic and event-controlled data transmission.

To optimize processing of the functions provided by the software components 30, advantageously only those software components 30 are executed for which the associated input signals, particularly those applied to the inputs IN and/or IN, have changed since the software components were last executed. Otherwise, it is possible to revert to the output signals already ascertained since the last execution, which are applied to the outputs OUT and/or OUT, in particular. This reduces the necessary processing time for a function provided by a software component 30.

Besides the aforementioned forms, a software component 30 can also be formed by an archive software program in which, in particular, the process data PD can be stored and retrieved. Alternatively, it can be formed by an alarm-raising software program which can be used to detect, in particular, critical values for at least one portion of the process data PD and to display them in a suitable form, for example using a text message on a screen and/or using an audible signal.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for operating a technical installation including a plurality of field devices for monitoring and controlling components of the technical installation, at least one process control computer for monitoring and controlling the technical installation, and at least one communication channel by which the field devices are connected to the process control computer, the field devices for transmitting to the process control computer measurement data which arise in the technical installation and describe the operating state of at least one of the components and for receiving control commands from the process control computer, wherein the measurement-data and control commands are transmitted between at least one portion of the field devices and the process control computer via the communication channel using a Transmission Control Protocol/Internet Protocol (TCP/IP), wherein the process control computer includes a web server for connection to at least one of the Internet and an intranet, and wherein at least one of operator control and monitoring functions of the technical installation implemented in the process control computer by software, are executed using a client computer including an Internet browser and is connected to at least one of the Internet and the intranet, by access to the process control computer, the method comprising:

assembling the at least one of operator control and monitoring functions from software components including directly executable software code, each software component further including a respective interface which is usable to set up at least one of a connection from a first software component to a second software component, a connection to the web server, and a connection to at least one of a sensor and actuator, the interfaces being compatible with one another such that setting up the connection does not require any alignment of signals transmitted via the connection, wherein at least one of inputs and outputs on the interface of the first software component are directly connectable to at least one of outputs and inputs on the interface of the second software component; and executing at least one of the operator control and monitoring functions assembled from at least two software components, without any compilation and loading operation taking place for this at least one of operator control and monitoring function beforehand on that computer on which this function is executed.

2. The method as claimed in claim 1, wherein the communication channel includes at least one of the Internet, the intranet and a radio link.

3. The method as claimed in claim 1, wherein essentially all of the process data for the technical installation, processed in the process control computer, are respectively assigned a Uniform Resource Locator (URL) address.

4. The method as claimed in claim 2, wherein essentially all of the process data for the technical installation, processed in the process control computer, are respectively assigned a URL address.

5. A process control system for operating a technical installation, comprising:

at least one process control computer for monitoring and controlling the technical installation, the process control computer including a web server for setting up a connection to at least one of the Internet and an intranet such that process data arising in the process control computer is transmittable via the at least one of the Internet and intranet and data is receivable from the at least one of the Internet and intranet;

at least one client computer for at least one of operator control and monitoring of the technical installation via at least one of the Internet and the intranet using a browser installed on the at least one client computer, the browser being usable to connect the client computer to the at least one of the Internet and intranet; and a plurality of sensors and actuators, arranged at least proximate the technical installation, adapted to record measured variables in the technical installation and to make adjustments to components in the technical installation connected to the process control computer via at least one communication channel and adapted to transmit measurement data to the process control computer and receive control commands from the process control computer, wherein at least a first portion of control software for controlling the technical installation is installed and is executable on the process control computer, wherein the control software includes, a software component adapted to implement a respectively associated function of the control software, a software component including byte code executable on a target computer directly without a preceding compilation and loading operation, a software component executable independently in the sense that it does not require execution of another software component in parallel in order to be executed, wherein each software component includes a respective interface which is usable to set up at least one of a connection from a first software component to a second software component, a connection to the web server, and a connection to at least one of a sensor and actuator, the interfaces being compatible with one another such that setting up the connection does not require any alignment of signals transmitted via the connection, wherein at least one of inputs and outputs on the interface of the first software component are directly connectable to at least one of outputs and inputs on the interface of the second software component.

6. The process control system as claimed in claim 5, wherein the communication channel includes at least one of a radio link, a bus link, the Internet and an intranet.

7. The process control system as claimed in claim 5, wherein at least one of the measurement data and control commands are transmitted via the communication channel using a TCP/IP protocol.

8. The process control system as claimed in claim 5, wherein at least one of the measurement data and control commands are transmitted via the communication channel using a TCP/IP protocol.

9. The process control system as claimed in claim 5, wherein the process control computer is operatable using a real-time operating system and is configured in redundant form such that at least one error occurring during operation of the process control computer does not result in loss of the functionality of the process control computer, and the process control computer in such a case of error is practically functional without delay and without loss of data.

10. The process control system as claimed in claim 9, wherein essentially all of the functionality required for controlling and monitoring a technical installation is integrated in the process control computer.

11. The process control system as claimed in claim 9, wherein all of the process data fundamental to monitoring and controlling the technical installation and processed in the process control computer include a respective associated dedicated URL address, and wherein the client computer is thereby usable to access at least portions of the process data directly.

12. The process control system as claimed in claim 5, wherein the process control system includes at least one field device for monitoring and controlling components of the technical installation, the at least one field device including a second portion of the control software required for controlling the technical installation and includes at least one microprocessor adapted to execute the second portion of the control software on the field device, the at least one field device for reading in, preprocessing and transmitting to the process control computer the technical installation's measured variables recorded by the sensors and for receiving, preprocessing and transmitting to the actuators the control commands from the process control computer.

13. The process control system as claimed in claim 12, wherein the process control computer and the client computer include a virtual machine software program, at least one portion of the software components being executable both on the process control computer and on the client computer without alignment of the software components, and wherein the field device includes the virtual machine software program, at least one portion of the software components also being executable on the field device without alignment of the software components.

14. The process control system as claimed in claim 13, wherein essentially all of the functionality required for controlling and monitoring a technical installation is integrated in the process control computer.

15. The process control system as claimed in claim 13, wherein all of the process data fundamental to monitoring and controlling the technical installation and processed in the process control computer include a respective associated dedicated URL address, and wherein the client computer is thereby usable to access at least portions of the process data directly.

16. The process control system as claimed in claim 12, wherein essentially all of the functionality required for controlling and monitoring a technical installation is integrated in the process control computer.

17. The process control system as claimed in claim 12, wherein all of the process data fundamental to monitoring and controlling the technical installation and processed in the process control computer include a respective associated dedicated URL address, and wherein the client computer is thereby usable to access at least portions of the process data directly.

18. The process control system as claimed in claim 5, wherein the process control computer and the client computer include a virtual machine software program, at least one portion of the software components being executable both on the process control computer and on the client computer without alignment of the software components.

19. The process control system as claimed in claim 18, wherein essentially all of the functionality required for controlling and monitoring a technical installation is integrated in the process control computer.

20. The process control system as claimed in claim 18, wherein all of the process data fundamental to monitoring and controlling the technical installation and processed in the process control computer include a respective associated dedicated URL address, and wherein the client computer is thereby usable to access at least portions of the process data directly.

21. The process control system as claimed in claim 5, wherein at least one portion of the software components includes at least one of a message processing unit, assigned on the basis of the respectively implemented function, a diagnosis unit, an operator control and monitoring unit, and a parameterization unit, wherein the at least one unit is accessible via the software component interface.

22. The process control system as claimed in claim 21, wherein essentially all of the functionality required for controlling and monitoring a technical installation is integrated in the process control computer.

23. The process control system as claimed in claim 21, wherein all of the process data fundamental to monitoring and controlling the technical installation and processed in the process control computer include a respective associated dedicated URL address, and wherein the client computer is thereby usable to access at least portions of the process data directly.

24. The process control system as claimed in claim 5, wherein essentially all of the functionality required for controlling and monitoring a technical installation is integrated in the process control computer.

25. The process control system as claimed in claim 5, wherein all of the process data fundamental to monitoring and controlling the technical installation and processed in the process control computer include a respective associated dedicated URL address, and wherein the client computer is thereby usable to access at least portions of the process data directly.

26. A process control system for operating a technical installation, comprising:
- at least one process control computer for at least one of monitoring and controlling the technical installation;
- at least one client computer for at least one of operator control and monitoring of the technical installation; and
- a plurality of sensors and actuators, arranged at least proximate the technical installation, adapted to record measured variables in the technical installation and make adjustments to components in the technical installation and adapted to transmit measurement data to the process control computer and receive control commands from the process control computer, wherein at least a first portion of control software for controlling the technical installation is installed and is executable on the process control computer, wherein the control software includes,
  - a software component adapted to implement a respectively associated function of the control software,
  - a software component directly executable on a target computer without a preceding compilation and loading operation, and
  - a software component executable independently without requiring execution of another software component in parallel, wherein each software component includes a respective interface usable to set up at least one of a connection from a first software component to a second software component, a connection to a web server, and a connection to at least one of a sensor and actuator, the interfaces being compatible irrespective of any alignment of signals transmitted via the connection, wherein at least one of inputs and outputs on the interface of the first software component are directly connectable to at least one of outputs and inputs on the interface of the second software component.

\* \* \* \* \*